United States Patent
Benyamin

(10) Patent No.: US 11,021,992 B2
(45) Date of Patent: Jun. 1, 2021

(54) AIRCRAFT ENGINE COMPRISING A BEARING BETWEEN TWO CONCENTRIC SHAFTS

(71) Applicant: SAFRAN AIRCRAFT ENGINES, Paris (FR)

(72) Inventor: Serge Benyamin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 101 days.

(21) Appl. No.: 16/488,781

(22) PCT Filed: Feb. 26, 2018

(86) PCT No.: PCT/FR2018/050445
§ 371 (c)(1),
(2) Date: Aug. 26, 2019

(87) PCT Pub. No.: WO2018/158528
PCT Pub. Date: Sep. 7, 2018

(65) Prior Publication Data
US 2020/0109642 A1 Apr. 9, 2020

(30) Foreign Application Priority Data
Feb. 28, 2017 (FR) .................. 17 00200

(51) Int. Cl.
*F01D 21/04* (2006.01)
*F01D 25/16* (2006.01)
*F01D 25/28* (2006.01)

(52) U.S. Cl.
CPC .......... *F01D 21/045* (2013.01); *F01D 25/164* (2013.01); *F01D 25/28* (2013.01); *F05D 2220/323* (2013.01); *F05D 2240/50* (2013.01); *F05D 2240/60* (2013.01)

(58) Field of Classification Search
CPC .... F01D 21/045; F01D 25/162; F01D 25/164; F05D 2240/60; F02C 7/06
See application file for complete search history.

(56) References Cited

U.S. PATENT DOCUMENTS

| | | | |
|---|---|---|---|
| 3,727,998 A | 4/1973 | Haworth et al. | |
| 4,872,767 A * | 10/1989 | Knapp | F16C 33/586 384/99 |
| 6,325,546 B1 * | 12/2001 | Storace | F01D 21/04 384/536 |
| 6,447,248 B1 * | 9/2002 | Kastl | F01D 21/045 416/2 |

(Continued)

OTHER PUBLICATIONS

U.S. Appl. No. 16/483,118, filed Jun. 2, 2018.
(Continued)

*Primary Examiner* — David Hamaoui
*Assistant Examiner* — Jackson N Gillenwaters
(74) *Attorney, Agent, or Firm* — Oblon, McClelland, Maier & Neustadt, L.L.P.

(57) ABSTRACT

An inter-shaft bearing is supported by a support including a solid rigid body which is non-deformable during normal operation, but which can break in the event of an excessive stress, such as a blade failure. A damper included in the support limits the movements between the two shafts and prevents excessive instability.

12 Claims, 2 Drawing Sheets

(56) References Cited

U.S. PATENT DOCUMENTS

| | | | | |
|---|---|---|---|---|
| 8,342,796 | B2* | 1/2013 | Spencer | F01D 25/164 |
| | | | | 415/113 |
| 9,777,592 | B2* | 10/2017 | Denis | F01D 21/045 |
| 10,316,756 | B2* | 6/2019 | Gentile | F02C 7/277 |
| 2009/0139201 | A1 | 6/2009 | Storace | |
| 2013/0022448 | A1 | 1/2013 | Jadczak et al. | |
| 2016/0097298 | A1* | 4/2016 | Becoulet | F01D 9/02 |
| | | | | 415/18 |
| 2016/0097301 | A1* | 4/2016 | Rosenau | F01D 25/164 |
| | | | | 415/119 |
| 2016/0130975 | A1* | 5/2016 | Chilton | F01D 25/24 |
| | | | | 415/9 |
| 2018/0112672 | A1* | 4/2018 | Ganiger | F01D 25/164 |
| 2019/0170012 | A1* | 6/2019 | Yadav | F01D 25/16 |

OTHER PUBLICATIONS

International Search Report dated May 23, 2018 in PCT/FR2018/050445 filed on Feb. 26, 2018.
French Preliminary Search Report dated Jan. 9, 2018 in French Application 1700200 filed on Feb 28, 2017.
U.S. Appl. No. 16/488,858, filed Aug. 26, 2019, US-2019-0383216-A1, Serge Benyamin.

* cited by examiner

AIRCRAFT ENGINE COMPRISING A BEARING BETWEEN TWO CONCENTRIC SHAFTS

The object of the invention is an aircraft engine comprising a bearing between two concentric shafts, generally a low pressure rotor shaft and a high pressure rotor shaft of a turbomachine.

In case of a failure such as a vane rupture, in particular a rupture of a low pressure vane belonging to the low pressure rotor which can be caused by a debris ingestion at the inlet of the engine, the unbalance which appears in this rotor is responsible for significant vibration and radial movements, mainly if the support of one of the shaft bearings breaks and that a shaft windmilling appears. Significant loads and movements can thereby be also communicated to the high pressure rotor by the inter-shaft bearing, contacts between the rotors associated with both shafts become possible, as well as engine shutdown or destruction.

The main purpose of the invention is to limit consequences of the appearance of an unbalance, in particular following a vane rupture, on the rotor remained intact, by limiting damages, loads and/or shocks that the damaged rotor could otherwise transmit thereto and by making it possible thus to keep operating, at least in a degraded engine mode, for a sufficient duration to reduce an accident risk or gravity.

Under a general form, the invention relates to an aircraft engine comprising two concentric shafts extending in an engine axial direction, a bearing supporting a first of the shafts, and a support connecting the bearing to a second of the shafts, characterised in that the support comprises a mechanical decoupler, mainly consisting of a rigid body, in abutment through two opposite faces in an engine radial direction, perpendicular to the axial direction, on two abutting faces integral with the second shaft and the bearing respectively, the rigid body being able to be ruptured at a load threshold to be transmitted between the abutting faces, and a damper body housed in a cavity of the support delimited by the abutting faces.

The main characteristic of this device is that it maintains the support rigidity in normal operation, thus with the absence of risk to bring about instabilities, unlike a conventional dampener support, but a significant decoupling of radial movements is produced between shafts in case of accident such as a vane rupture, which results in a sufficient unbalance to rupture the device. The radial movements of the high pressure shaft are thereby not much affected by those of the low pressure shaft, and its operation is thus not much worsened. This decoupling is accompanied with a dampener likely to mitigate instabilities of the damaged rotor. In other words, the system comprises a state in which respective bearing portions are respectively integral with the shafts and a state in which one of said bearing portions becomes movable in the radial direction with respect to the shaft with which it is integral, and dampened with respect to said shaft.

Among improvements that can be brought to this basic design, the following ones can be mentioned: the rigid body consists of two parts, each delimiting the cavity between the abutting faces and thus conveniently protecting the dampener body; the rigid body is of brittle material, which is immediately destroyed when the rupture threshold is reached, and releases the dampener body; a suitable brittle material is a ceramic, that can be porous; the brittle material can be pre-stressed; the damper body can be of elastomer, or consist of a fluid-filled bag.

The invention will be described in connection with the figures, which describe some possible embodiments of the invention, being non-exclusive of others:

and FIGS. 4, 5, 6 and 7 are four alternative embodiments of the rigid body of the invention.

Figure 1:
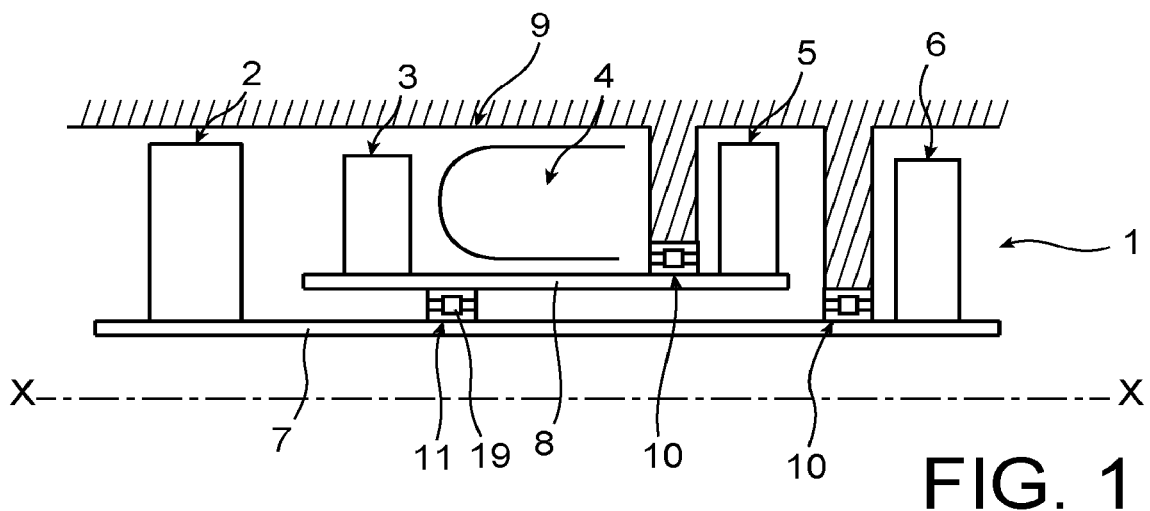
FIG. 1 is a general view of an engine that can be equipped with the invention.

FIG. 1 is referred to.

A conventional type aircraft turbomachine successively comprises, along a gas flow stream 1 and in an axial direction X, a low pressure compressor 2, a high pressure compressor 3, a combustion chamber 4, a high pressure turbine 5 and a low pressure turbine 6, the compressors and turbines consisting of fixed and movable vane stages alternating along the stream 1. The movable vanes depend on rotors comprising in particular a low pressure shaft 7 on which the movable vanes of the low pressure compressor 2 and of the low pressure turbine 6 depend, and a high pressure shaft 8 on which the movable vanes of the high pressure compressor 3 and the high pressure turbine 5 depend. The engine further comprises a stator 9 in which the shafts 7 and 8 are supported by bearings 10, only some of which are represented. In addition, a bearing 11 can be added between both shafts 7 and 8, and it is at this place that the invention is applied.

Figure 2:
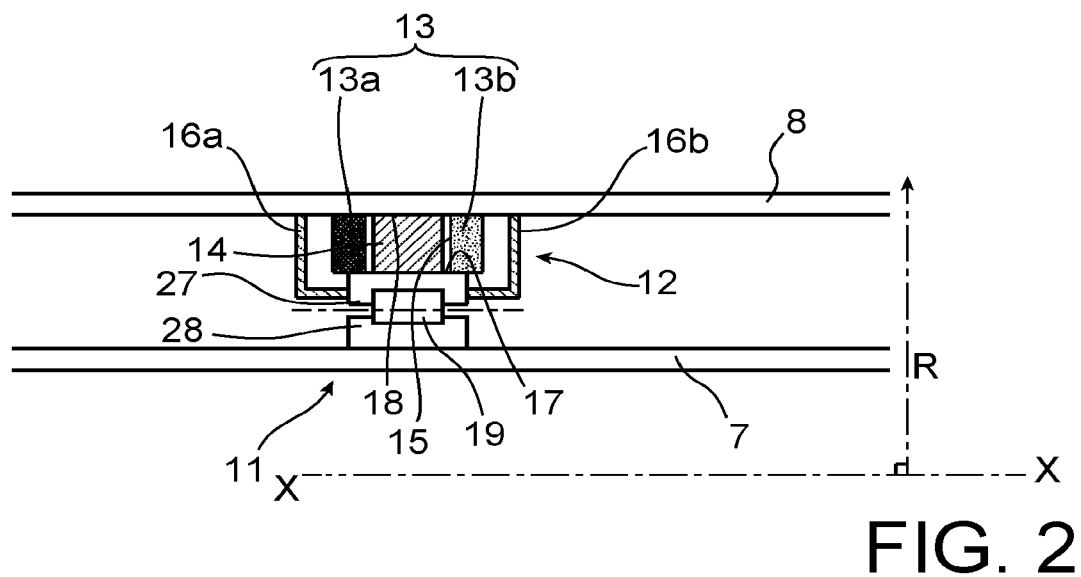
FIG. 2 represents the characteristic device.

FIG. 2 is now referred to. The bearing 11 can be a roller bearing 19 or the like. It comprises an inner ring 28 which is here directly in contact with the low pressure shaft 7, and an outer ring 27 which is connected to the high pressure shaft 8 by a support 12, which is a decoupler comprising two main parts: a rigid body 13 here consisting of two washers 13a and 13b, the inner radial face of which abuts against an abutting face 17 of the outer ring of the bearing 11, and the outer of which abuts against radial face an abutting face 18 of the high pressure shaft 8; and a dampener body 14 housed in a cavity 15 axially delimited by the washers 13a and 13b, and radially by the abutting face 17 of the outer ring 27 of the bearing 11 and the abutting face 18 of the high pressure shaft 8. The support 12 further comprises flanges 16a and 16b connecting the high pressure shaft 8 to the outer ring of the bearing 11 by covering the washers 13a and 13b and between which the rigid body 13 and the dampener body 14 are placed. The radial direction of the engine is noted R, perpendicular to X.

The main property of the rigid body 13 is to support the bearing 11 by maintaining constant its distance from the high pressure shaft 8 under normal operating conditions, with reduced deformations arising from a low elasticity, but it be ruptured if subjected to abnormal loads, normally resulting from a significant unbalance undergone by one of the shafts, in particular the low pressure shaft 7. The damping body 14 is inactive during normal operation, and it begins to operate only upon the rupture of the rigid body 13. It can be housed in the cavity 15 with a clearance at least in the radial direction R, but it is more advantageously housed therein without a positive clearance and with a pre-stress in the radial direction R between the abutting faces 17 and 18, such that it becomes active by being compressed as soon as the rigid body 13 begins to be ruptured.

Figure 3:
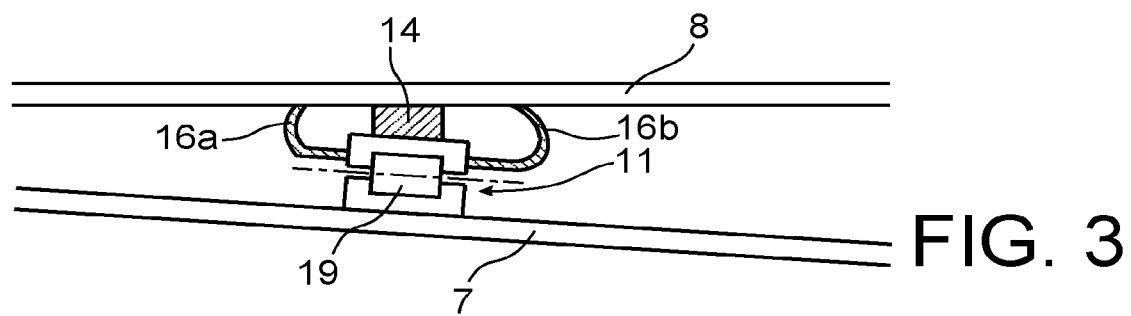
FIG. 3 represents the same device and the engine operation in case of a failure.
Figure 4:
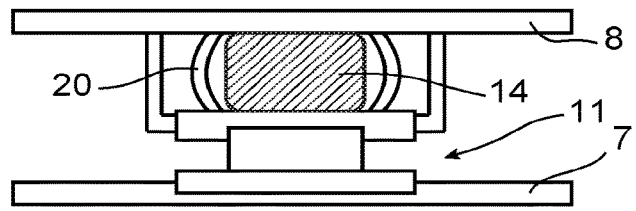
Figure 5:
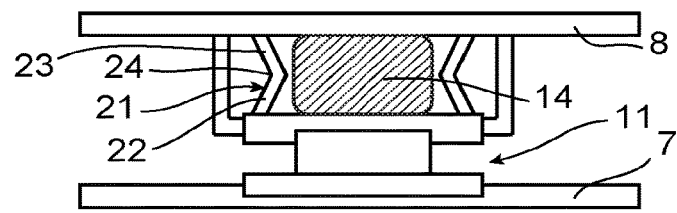
Figure 6:
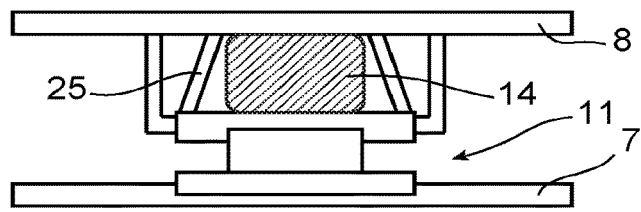

As shown in FIG. 3 which represents the state of the device after a vane is ruptured and the rigid body 13 is ruptured, the low pressure shaft 7 undergoing the unbalance thereby undergoes windmilling which places it obliquely with respect to the other and moves it closer to the same. The damping body 14 is pressed on part of its circumference between the high pressure shaft 8 and the bearing 11, but prevents them from moving closer to each other and the system from having a higher instability, and the shaft remaining intact (here and usually, the high pressure shaft 8) only undergoes small radial movements and can keep operating the engine.

Figure 7:
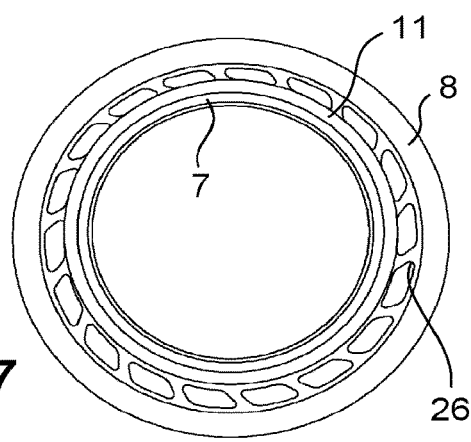

The rigid body 13 is thus essentially non-deformable during normal operation, but able to be fully ruptured when the load threshold for which it has been designed is reached. More generally, it includes an incipient break. Either it is an incipient break made by the microscopic structure of materials such as engineered ceramics generally with a sintering which imparts them a high mechanical strength, and which can also resist to high temperatures. The material is inhomogeneous and its heterogeneities create incipient breaks. The rupture threshold can be adjusted by manufacturing these ceramics with a defined porosity, by mounting them with a pre-stress, or by wisely choosing the dimensions of the rigid body 13. A bloc with a height/width ratio close to 1 is preferred to build such a rigid body. Or it is an incipient break made by the shape of the rigid body 13, enabling it to work in shearing. In this case, a homogeneous material, typically a metal, will be chosen. Several shapes are adapted to work in shearing. Among the possible shapes of the rigid body 13 which are provided with a shape irregularity enabling this incipient break to be created, there will be mentioned: a domed or arcuate shape 20 in the axial direction X (FIG. 4); a bent-section biconical shape 21 (FIG. 5), formed by two portions 22 and 23 with different slopes, preferably with opposite directions, respectively leading to the abutting faces 17 and 18 and meeting at half-height by forming an angle 24; a sloped section conical shape 25, still in the axial direction X (FIG. 6); or a construction with small columns 26 sloped in the angular machine direction (FIG. 7). To summarise, the shape irregularity of the rigid body 13 able to create an incipient break can consist of a slope, or a slope variation, in the axial direction X and/or an angular direction perpendicular to the axial direction X and to the radial direction R; the rigid body 13 can thus comprise two portions successively in the radial direction, the slopes of which are different from each other.

When the section of the rigid body 13 is irregular and sloped, the slope direction can be any direction. If the rigid body 13 comprises two portions located on either side of the rollers 19 or more generally rolling elements of the bearing 11, as in the embodiments represented, these portions can be symmetrical with respect to these rolling elements. Finally, the rigid body 13 can generally be continuous or discontinuous over the circumference of the bearing 11.

The flanges 16a and 16b have not necessarily a mechanical strength role and can thus be flexible, but they can contribute to axially maintaining the outer ring 27 of the bearing 11. The damping body 14 has the conventional energy dissipater function and can consist of an elastomer or a bag filled with a viscous liquid. The support 12 and all its components can be continuous or not on a circle, as the rigid body 13. Arrangements other than the cavity 15 extending between two opposite parts of the rigid body 13 can also be considered to house the damping body 14. It is preferable that the rigid body 13 is limited by an empty volume in the axial direction X (or two empty volumes on either side of the same) in order to enable it to be released after rupture. Finally, the support 12 could be located inside or outside the bearing 11.

The device of the invention has thus no detrimental effects on the normal engine operation, because of the rigidity of the rigid body 13. After the same is ruptured, the damping to which the system is then subjected enables inter-shaft shocks to be dampened while moving farther the engine speed from a possible instability frequency by natural deceleration.

The invention claimed is:

1. An aircraft engine comprising two concentric shafts extending in an engine axial direction; a bearing supporting a first of the shafts and a support connecting the bearing to a second of the shafts, the support comprises a mechanical decoupler, including a rigid body, in abutment through two opposite faces in an engine radial direction, perpendicular to an axial direction, on two abutting faces integral with the second shaft and the bearing respectively, the rigid body being able to be ruptured at a load threshold to be transmitted between the abutting faces, and a damper body housed in a cavity of the support delimited by the abutting faces.

2. The engine according to claim 1, wherein the rigid body includes two parts, each delimiting the cavity between the abutting faces.

3. The engine according to claim 1, wherein the decoupler is annular.

4. The engine according to claim 1, wherein the rigid body is of brittle material.

5. The engine according to claim 4, wherein the brittle material is a ceramic.

6. The engine according to claim 1, wherein the rigid body extends in at least one of the radial direction with a slope in the axial direction or an angular direction perpendicular to the axial direction and to the radial direction.

7. The engine according to claim 6, wherein the rigid body comprises two portions successively in the radial direction, the slope of a first of said portions being different from the slope of a second of said portions.

8. The engine according to claim 1, wherein the rigid body is limited by an empty volume in the axial direction.

9. The engine according to claim 1, wherein the damper body is pre-stressed in the radial direction between the abutting faces.

10. The engine according to any of claim 1, wherein the mechanical decoupler further comprises side flanges extending between the second shaft and the bearing, the rigid body and the damper body being placed between the flanges.

11. The engine according to claim 10, wherein the flanges are flexible.

12. The engine according to claim 1, wherein the engine includes a state in which respective portions of the bearing are respectively integral with the shafts and a state in which one of said portions is movable in the radial direction with respect to the shaft with which one of said portions is integral and dampened with respect to said shaft.

* * * * *